US011686290B2

(12) United States Patent
Neumann et al.

(10) Patent No.: US 11,686,290 B2
(45) Date of Patent: Jun. 27, 2023

(54) LIFTING DEVICE FOR A WIND TURBINE ROTOR BLADE

(71) Applicant: General Electric Company, Schenectady, NY (US)

(72) Inventors: Ulrich Werner Neumann, Simpsonville, SC (US); Molly Christine Stieber, Schenectady, NY (US); Emily Jacob Palmer, Chicago, IL (US); Joseph Lawrence Chacon, Greenville, SC (US); Ravi Chandra Kamarajugadda, Bangalore (IN)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 16/943,430

(22) Filed: Jul. 30, 2020

(65) Prior Publication Data

US 2022/0034302 A1    Feb. 3, 2022

(51) Int. Cl.
*F03D 13/10*    (2016.01)
*B66C 1/10*    (2006.01)
(Continued)

(52) U.S. Cl.
CPC .............. *F03D 13/10* (2016.05); *B66C 1/108* (2013.01); *B66C 13/06* (2013.01); *B66C 13/08* (2013.01); *B66C 13/16* (2013.01); *F05B 2230/61* (2013.01)

(58) Field of Classification Search
CPC ....... B66C 15/00; B66C 13/085; B66C 13/04; B66C 13/48; B66C 13/06; B66C 13/08;
(Continued)

(56) References Cited

U.S. PATENT DOCUMENTS

| 2016/0297650 A1 | 10/2016 | Bang |
| 2017/0218915 A1 | 8/2017 | Wilmot et al. |

(Continued)

FOREIGN PATENT DOCUMENTS

| DE | 102012010019 A1 | 11/2013 |
| DE | 102013219279 A1 | 3/2015 |

(Continued)

OTHER PUBLICATIONS

Van Oord et al., In the Press: Van Oord, Mammoet Team Targets Safer Blade Lifting, Verton, Jun. 21, 2019, 3 Pages. https://renews.biz/53882/van-oord-mammoet-team-targets-safer-blade-lifting/.

(Continued)

*Primary Examiner* — Moshe Wilensky
(74) *Attorney, Agent, or Firm* — Dority & Manning, P.A.

(57) ABSTRACT

A lift system for a rotor blade of a wind turbine includes a lifting device having a structural frame body having a root end and a tip end. The root end supports a root cradle and the tip end supports a tip cradle. The root and tip cradles each have a profile that corresponds to at least one exterior surface of the rotor blade so as to receive and support at least a portion of the rotor blade. Due to a shape of the rotor blade, when the rotor blade is installed in the lifting device and lifted uptower, the rotor blade can experience an asymmetric loading. Accordingly, the lift system also includes a variable airflow assembly coupled to tip end of the lifting device. The variable airflow assembly includes at least one surface moveable between a plurality of positions having varying resistances so as to counteract the asymmetric loading.

10 Claims, 15 Drawing Sheets

(51) Int. Cl.
*B66C 13/06* (2006.01)
*B66C 13/08* (2006.01)
*B66C 13/16* (2006.01)

(58) Field of Classification Search
CPC . B66C 13/16; B66C 1/16; B66C 1/108; F05B 2230/61; F03D 13/10
See application file for complete search history.

(56) References Cited

U.S. PATENT DOCUMENTS

2018/0251346 A1 9/2018 Thomson et al.
2018/0362306 A1* 12/2018 Lopez-Benedito ..... F03D 13/10

FOREIGN PATENT DOCUMENTS

| | | |
|---|---|---|
| EP | 3418555 A1 | 12/2018 |
| FR | 2922437 A1 | 4/2009 |
| JP | 2015101413 A | 6/2015 |
| JP | 2016210607 A | 12/2016 |
| KR | 20150102518 A | 9/2015 |
| KR | 101607995 B1 | 3/2016 |
| KR | 101649942 B1 | 8/2016 |
| RU | 2343102 C2 | 1/2009 |
| RU | 2525495 C1 | 8/2014 |
| WO | WO2015/082347 A1 | 6/2015 |
| WO | WO2017/059493 A1 | 4/2017 |
| WO | WO2017/136428 A1 | 8/2017 |
| WO | WO2018/192675 A1 | 10/2018 |
| WO | WO 2020/037018 A1 | 2/2020 |

OTHER PUBLICATIONS

European Search Report for EP Application No. 21188206.3, dated Dec. 20, 2021.

* cited by examiner

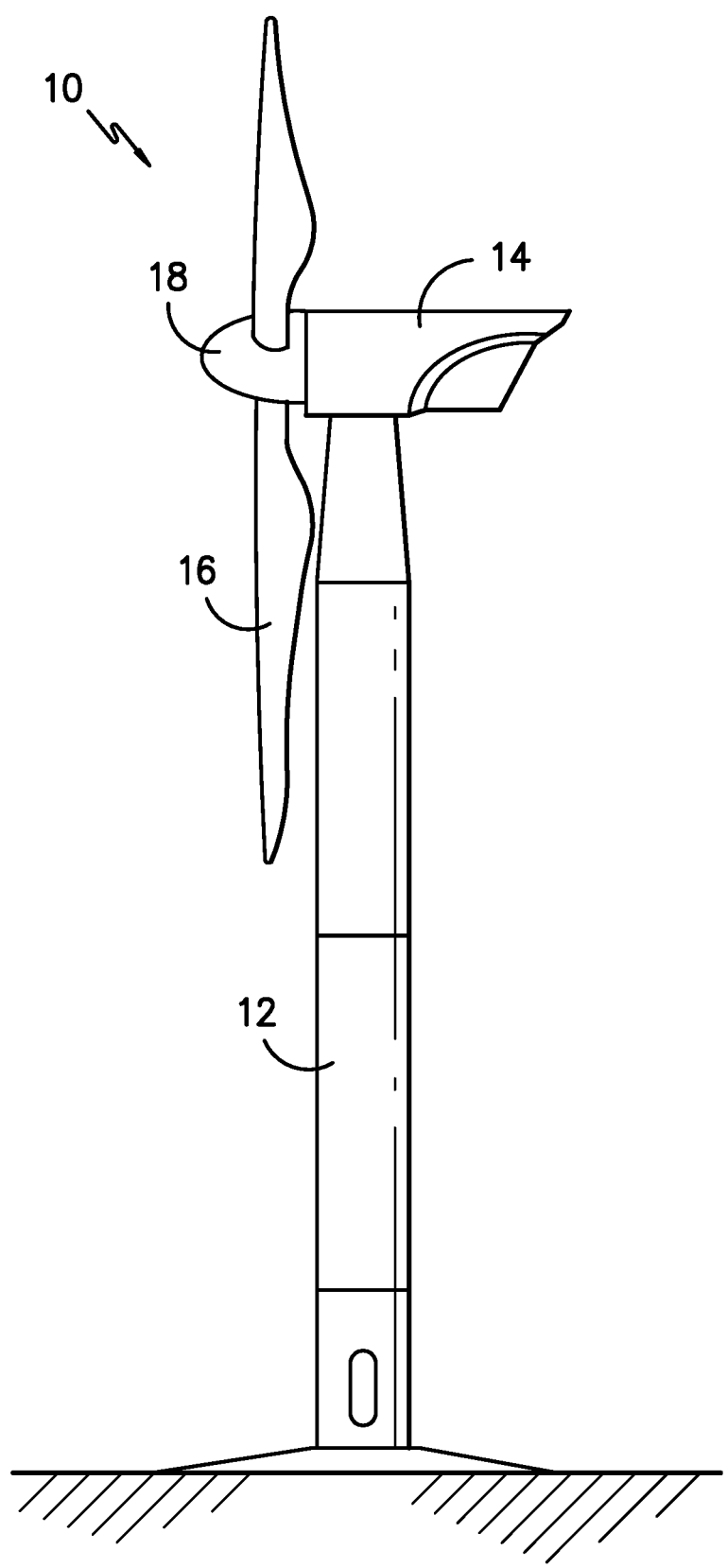
FIG. -1-

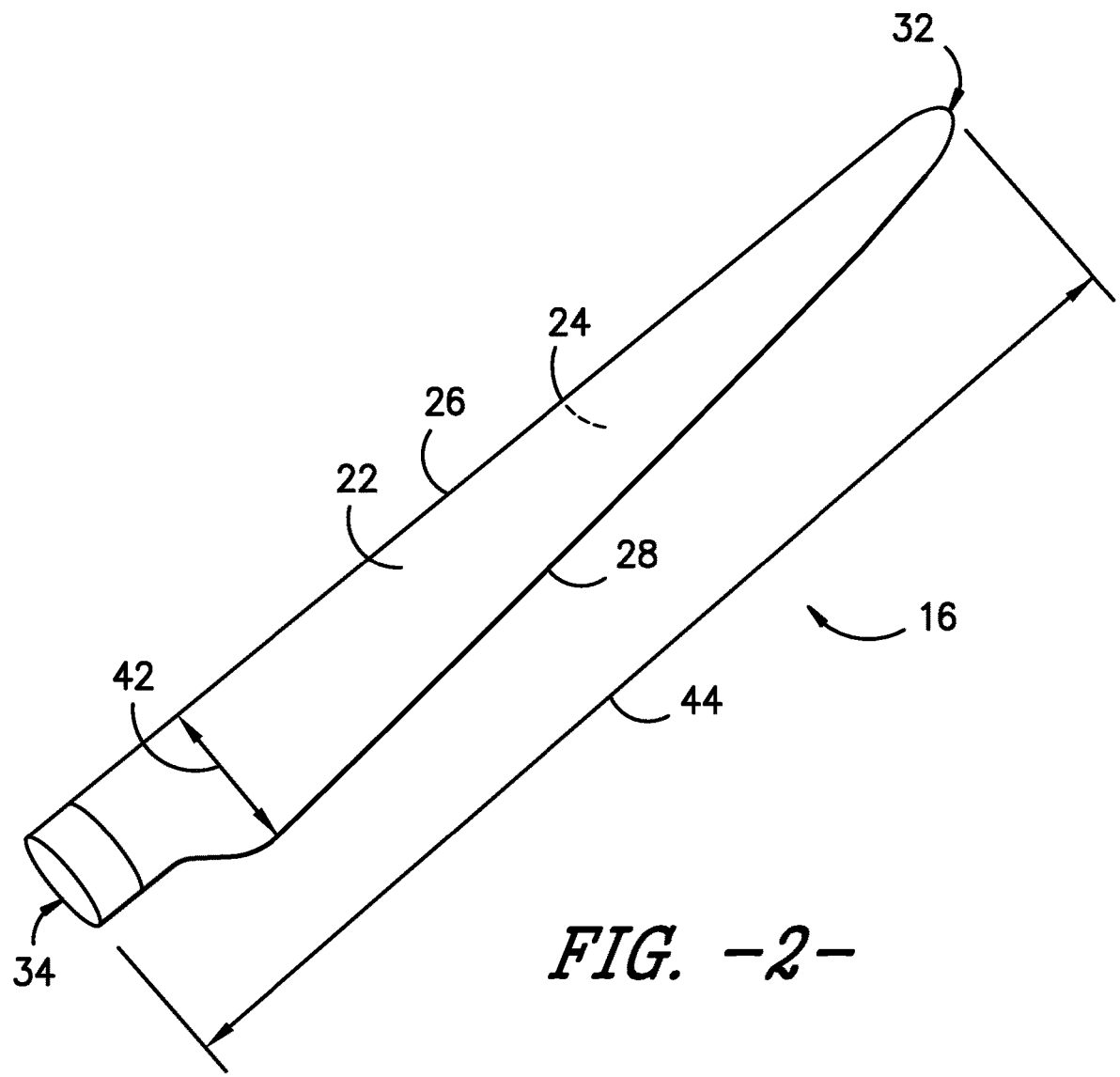
FIG. -2-

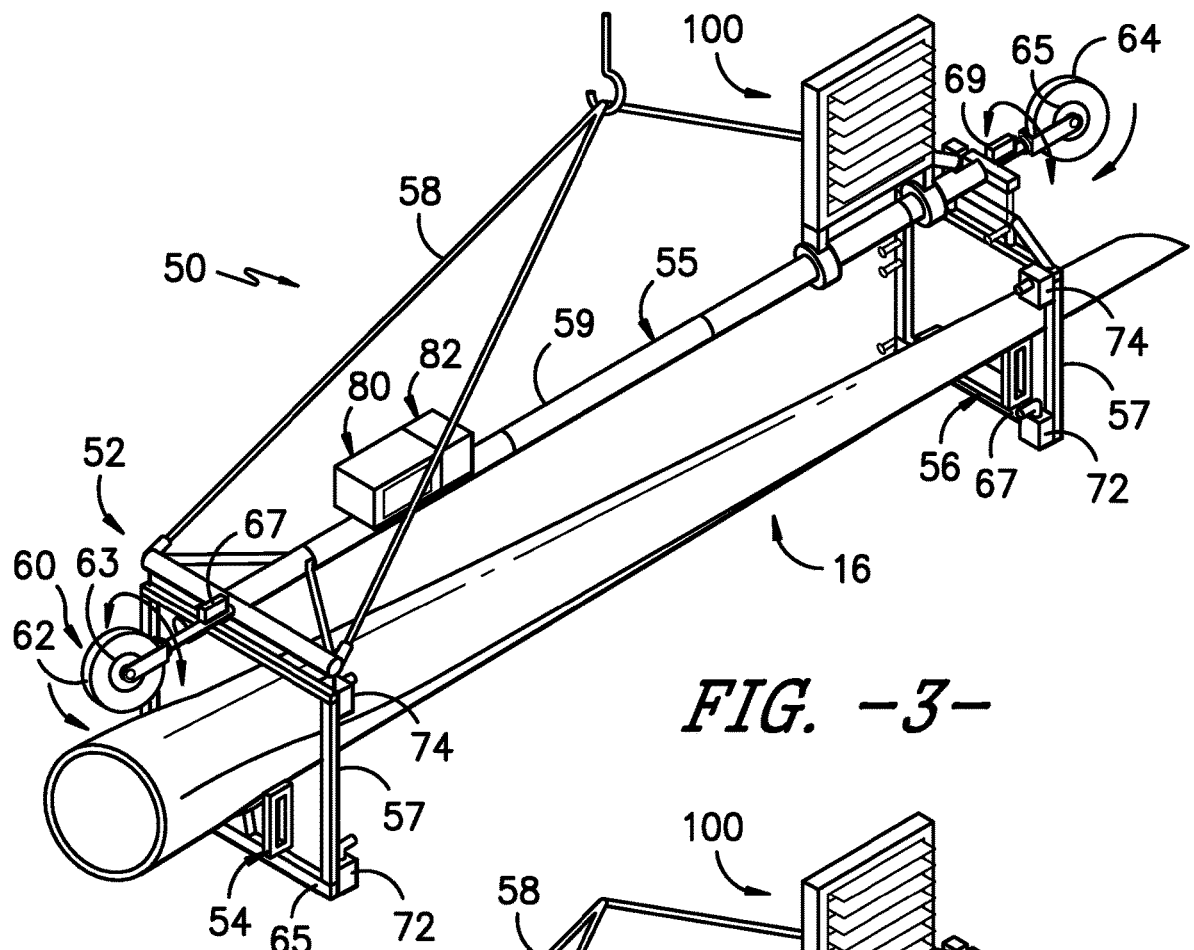
FIG. -3-
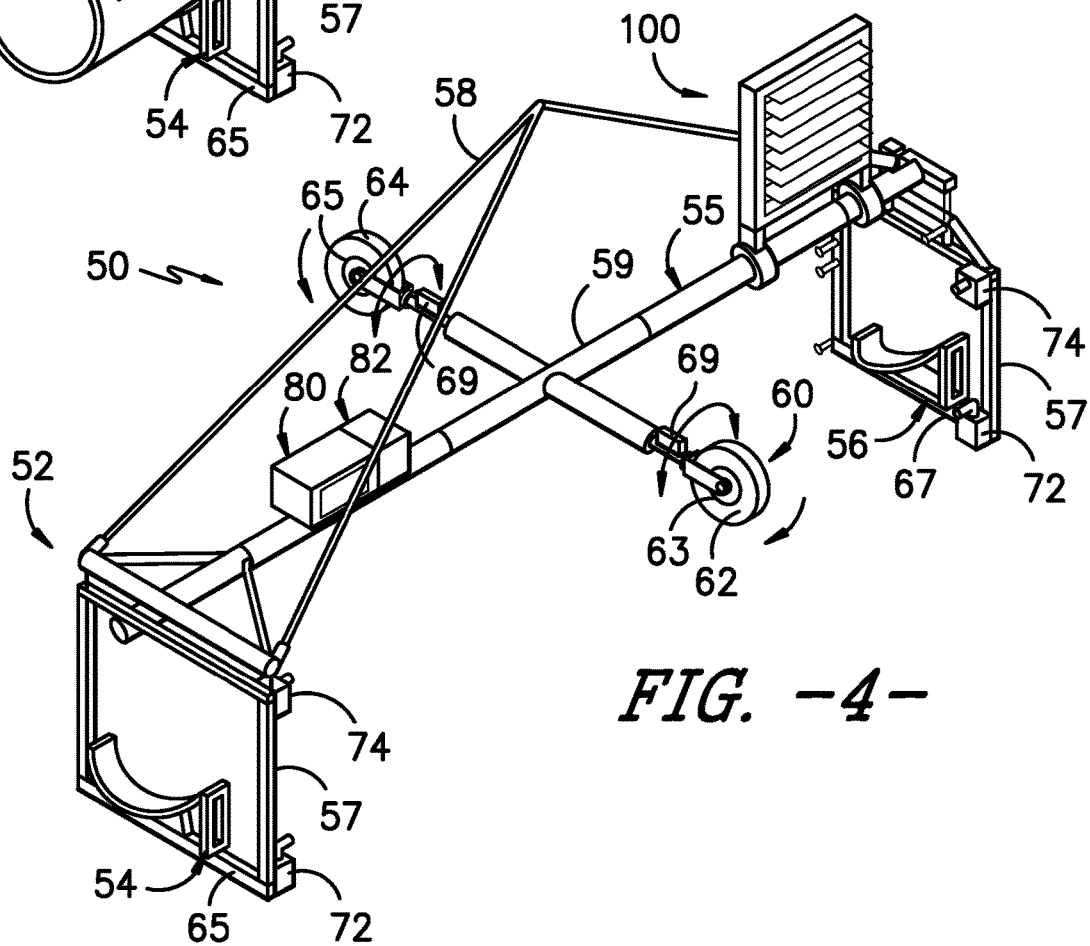
FIG. -4-

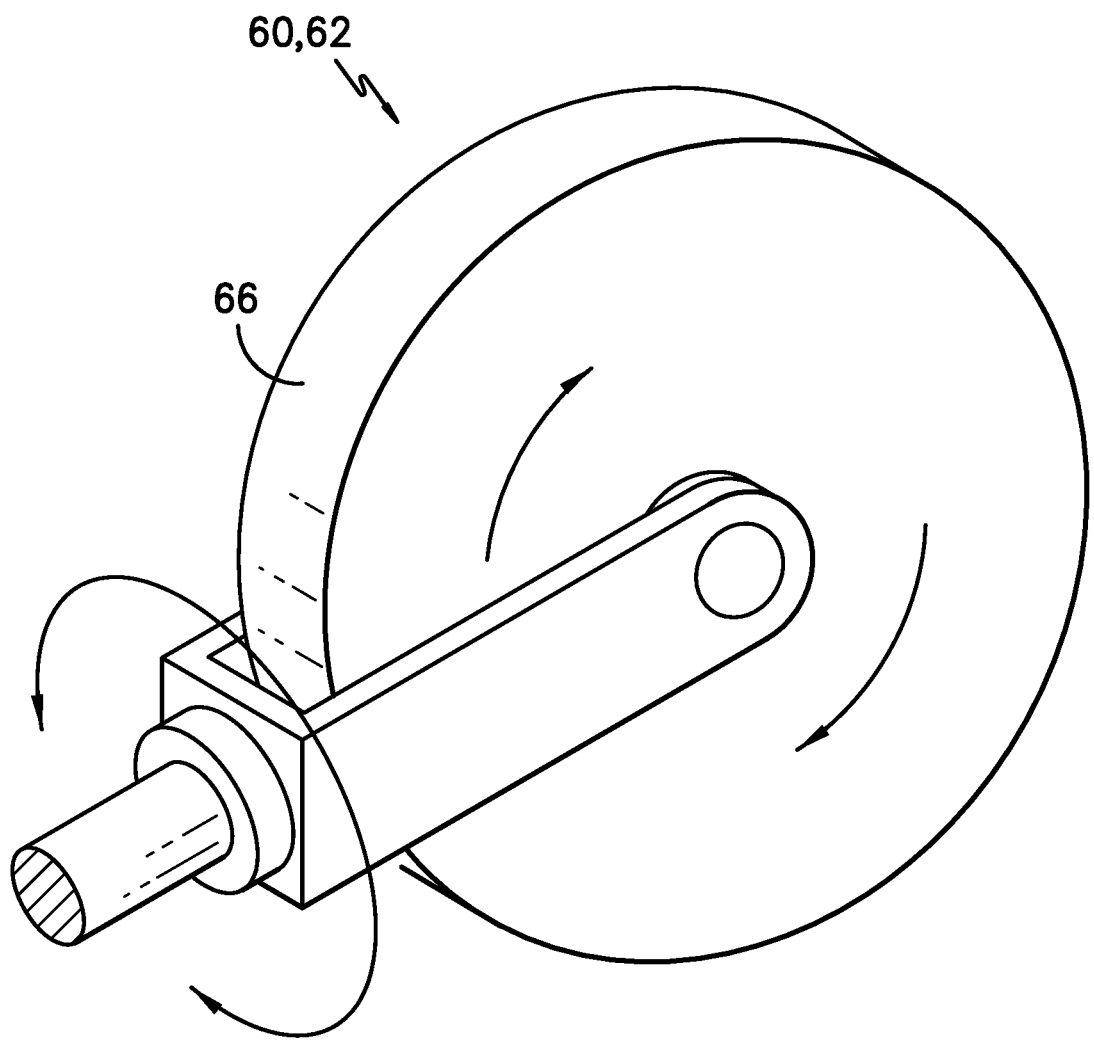
FIG. -5-

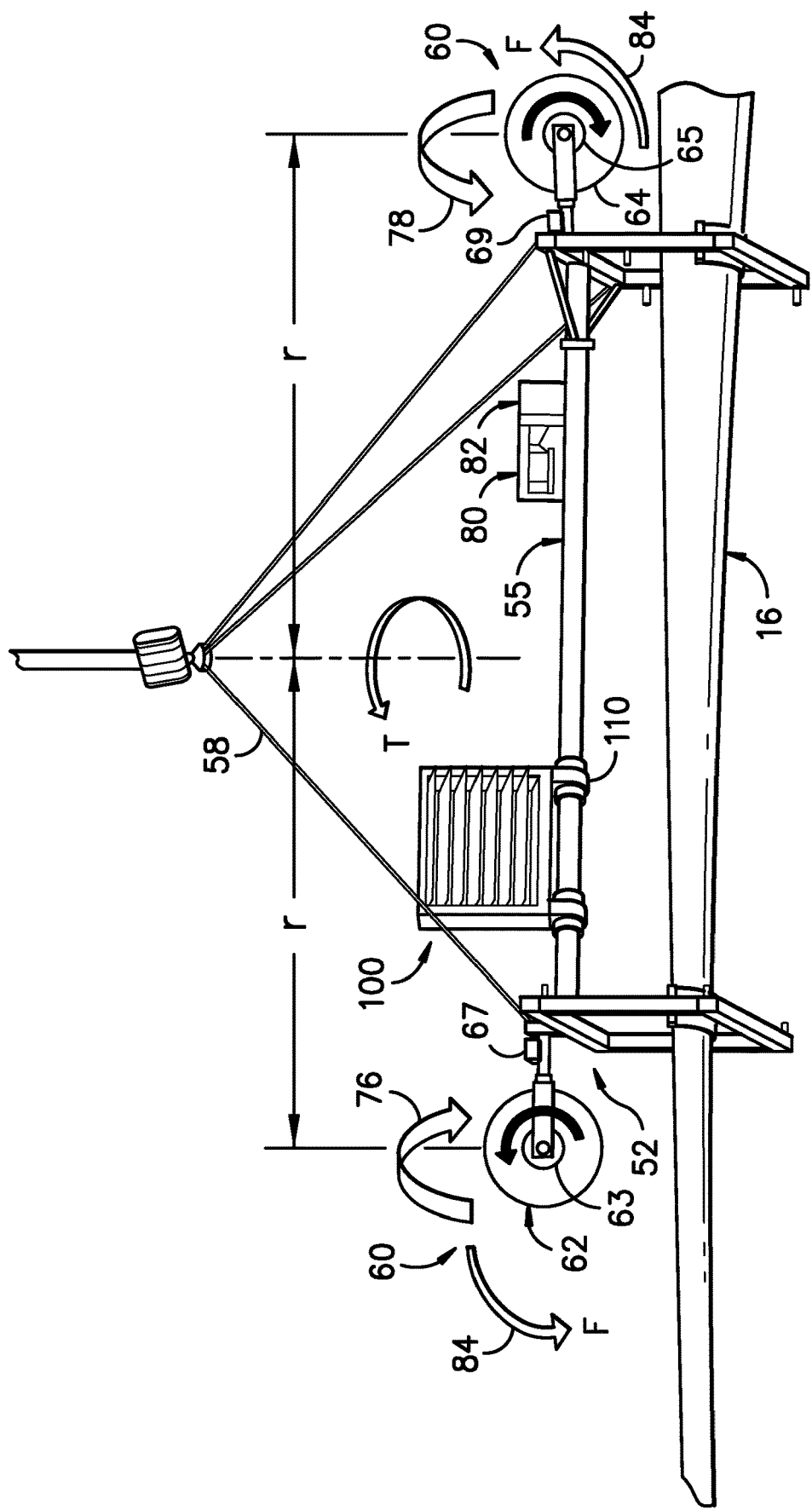
FIG. -6-

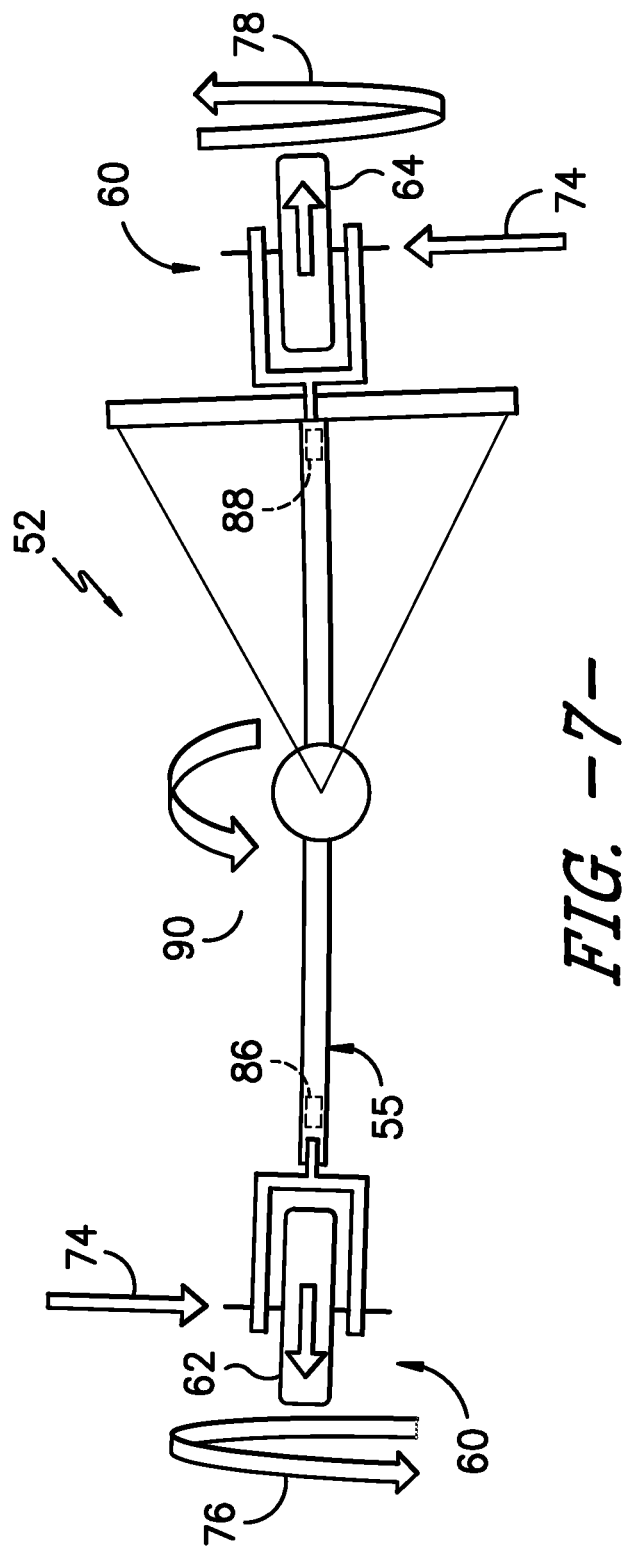
FIG. -7-

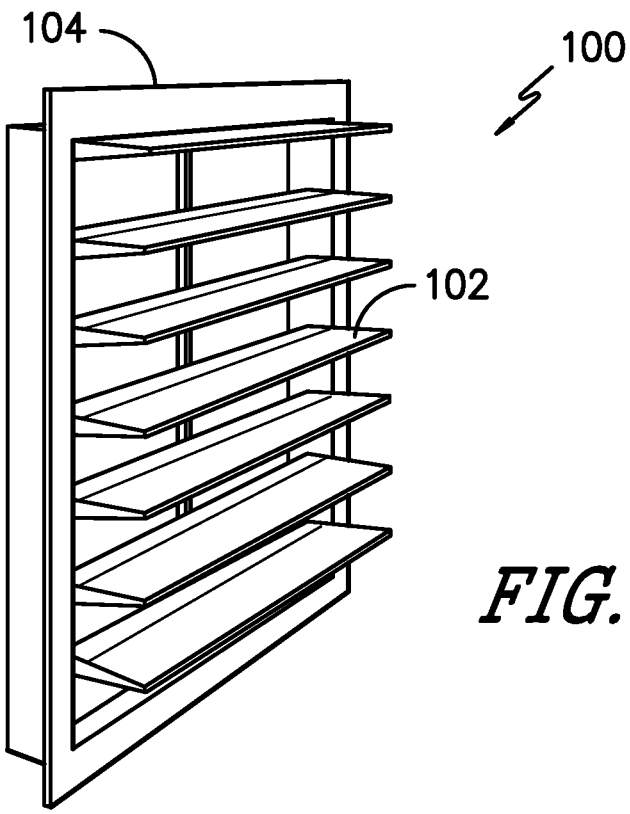
FIG. -8-
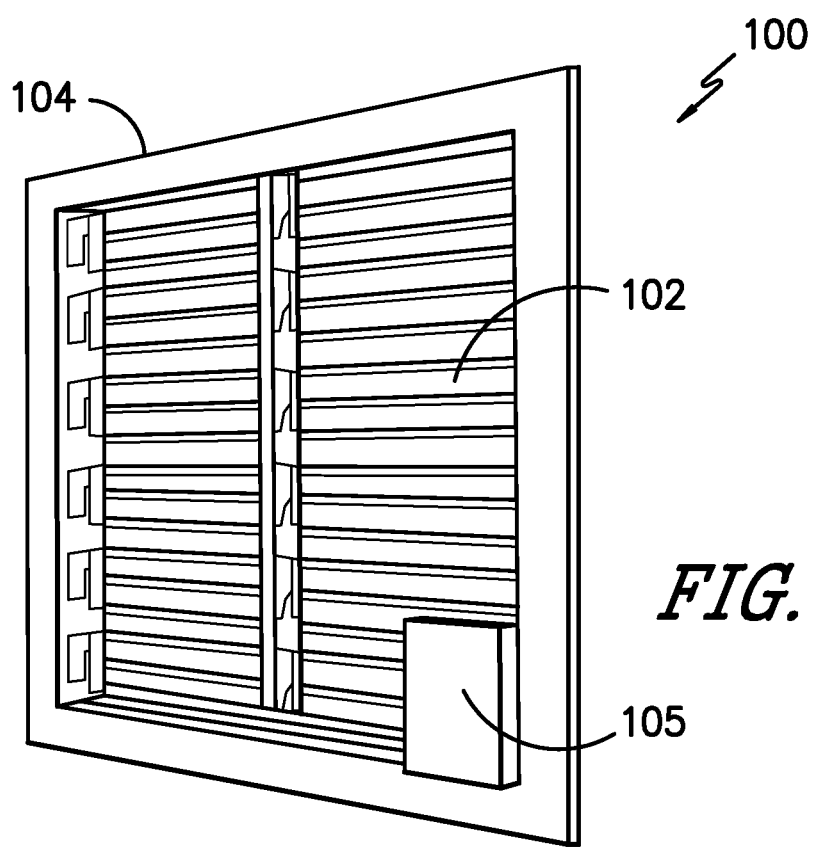
FIG. -9-

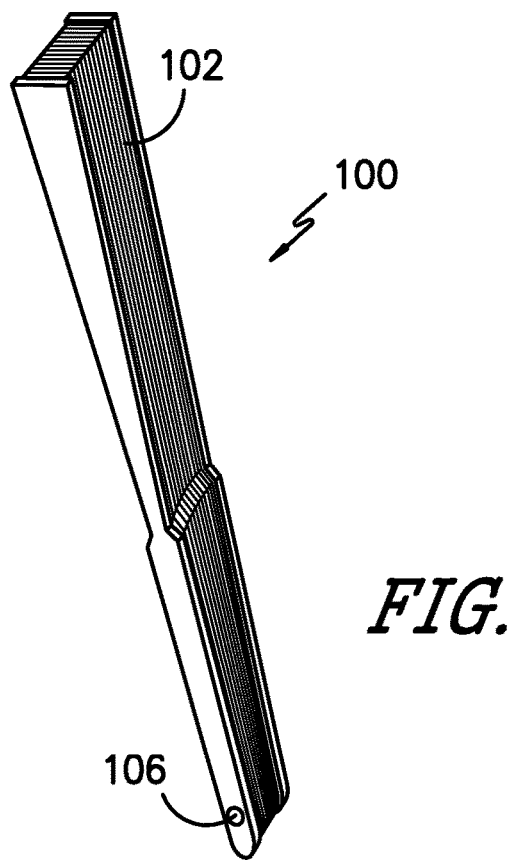
FIG. -10-
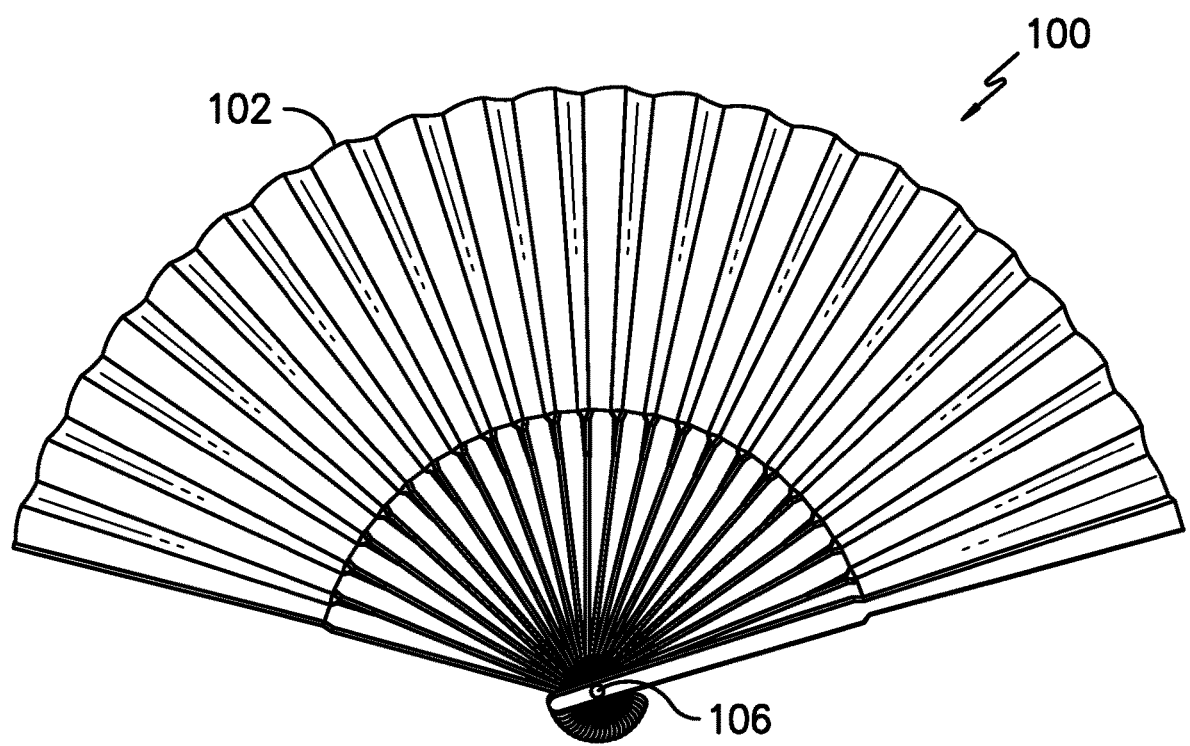
FIG. -11-

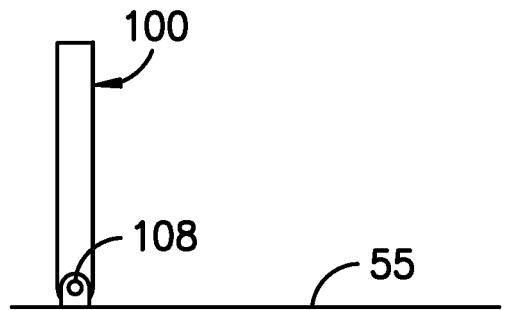
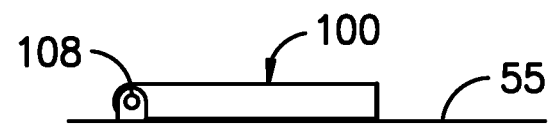
FIG. -12A-   FIG. -12B-
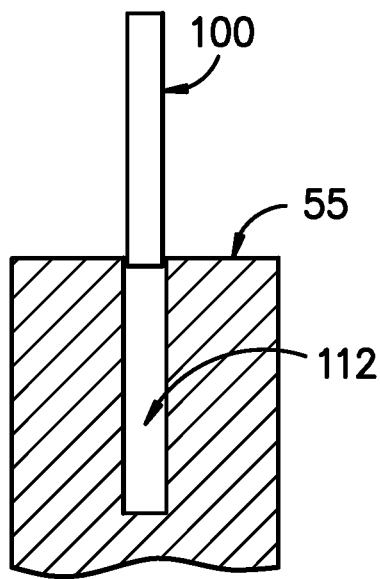
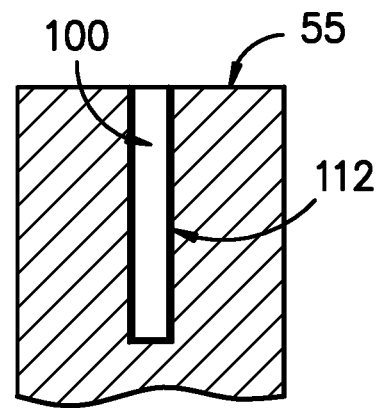
FIG. -13A-   FIG. -13B-

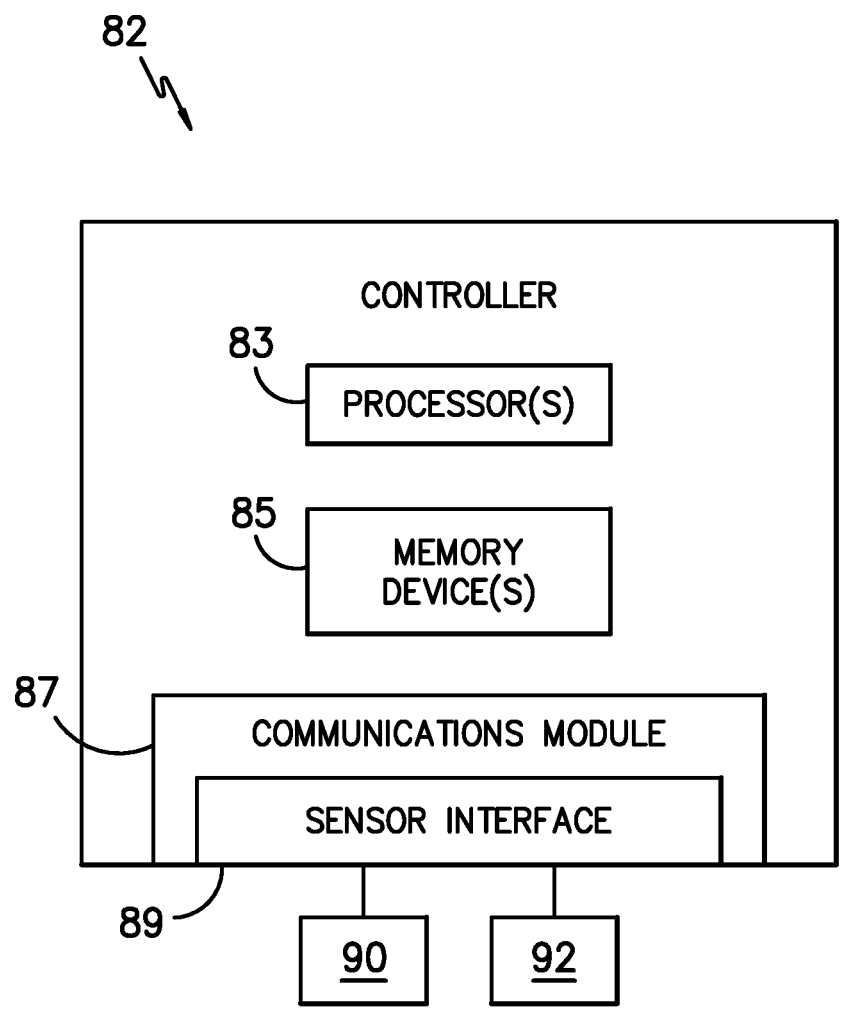
FIG. -14-

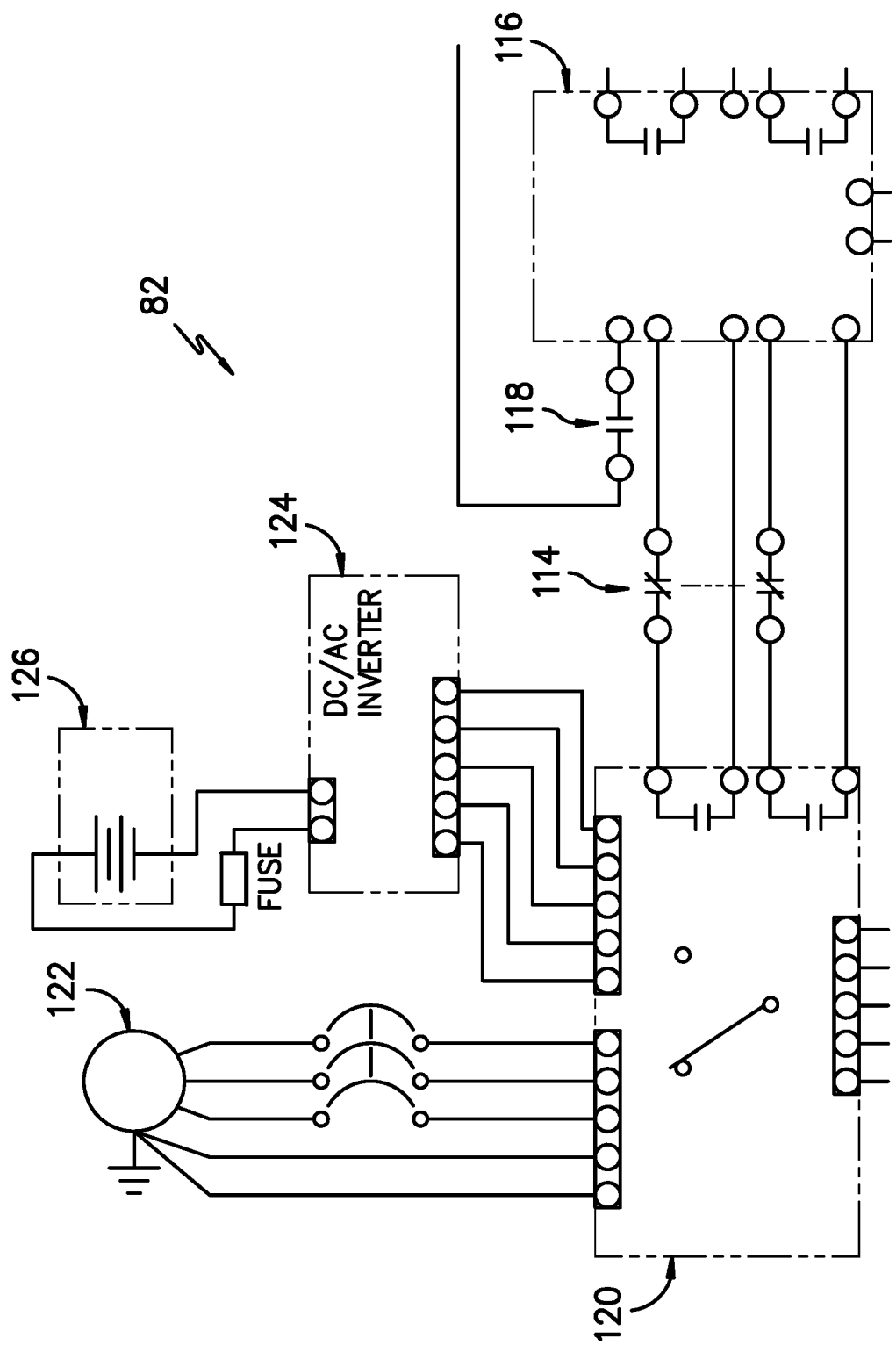
FIG. -15-

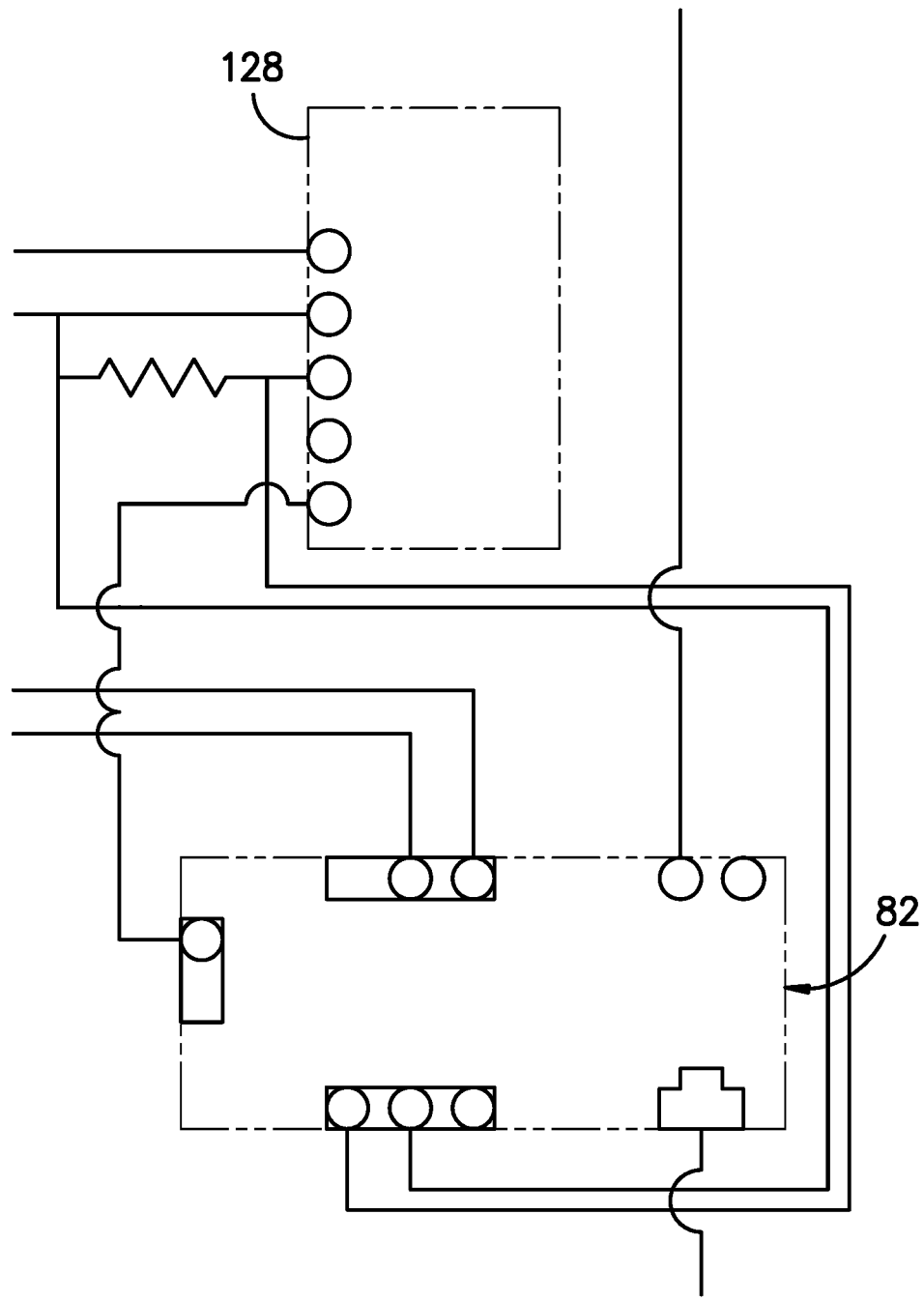
FIG. -16-

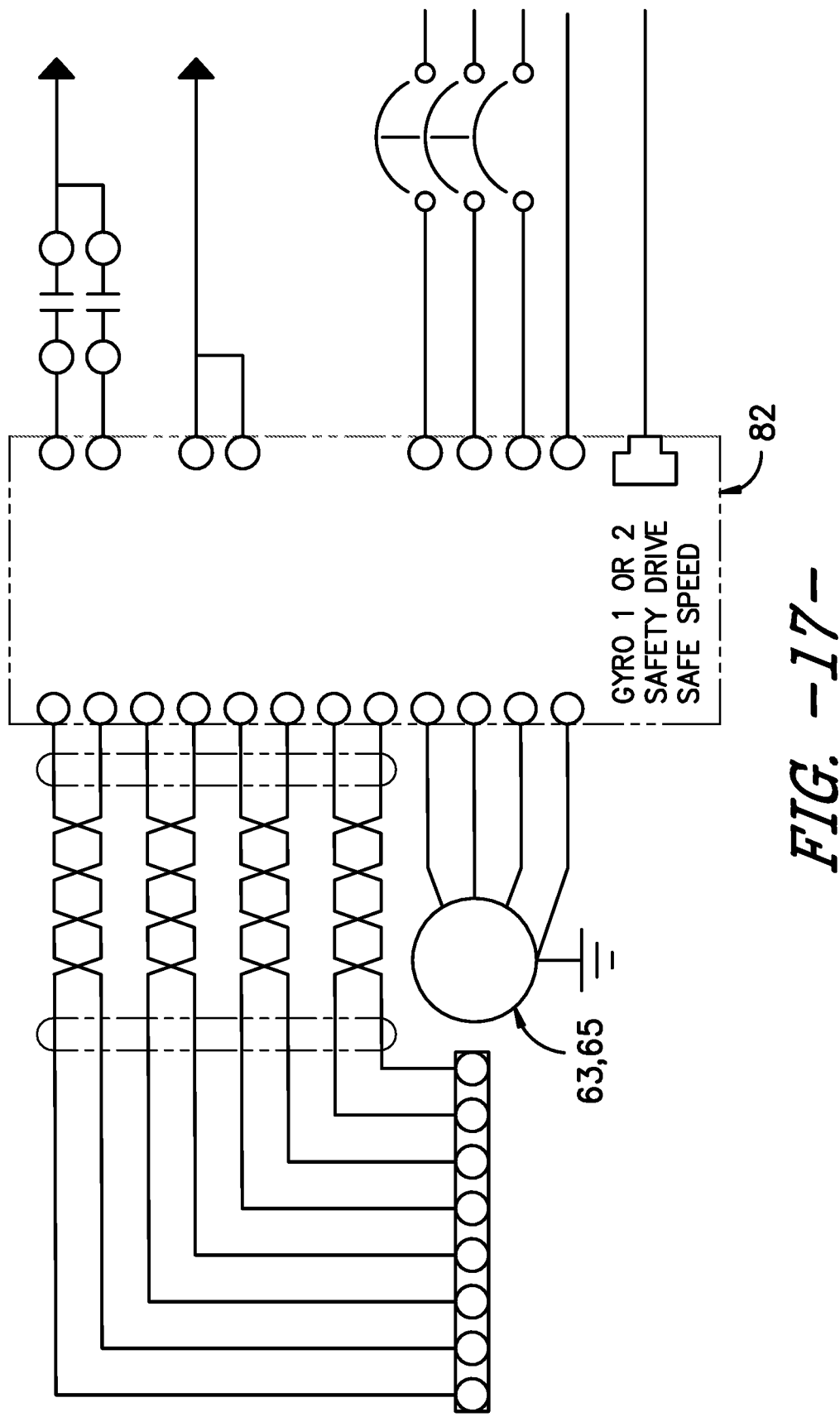
FIG. -17-

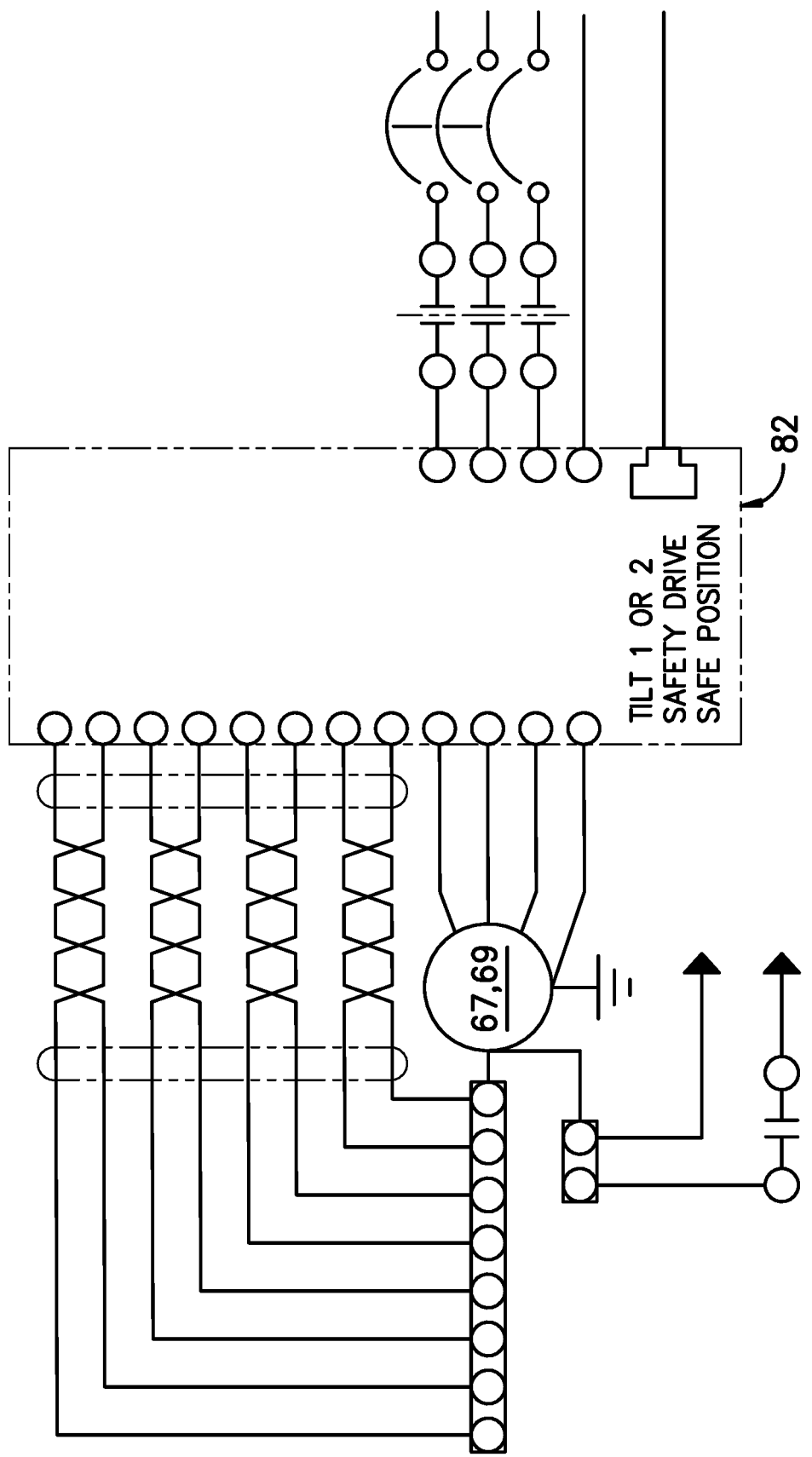
FIG. -18-

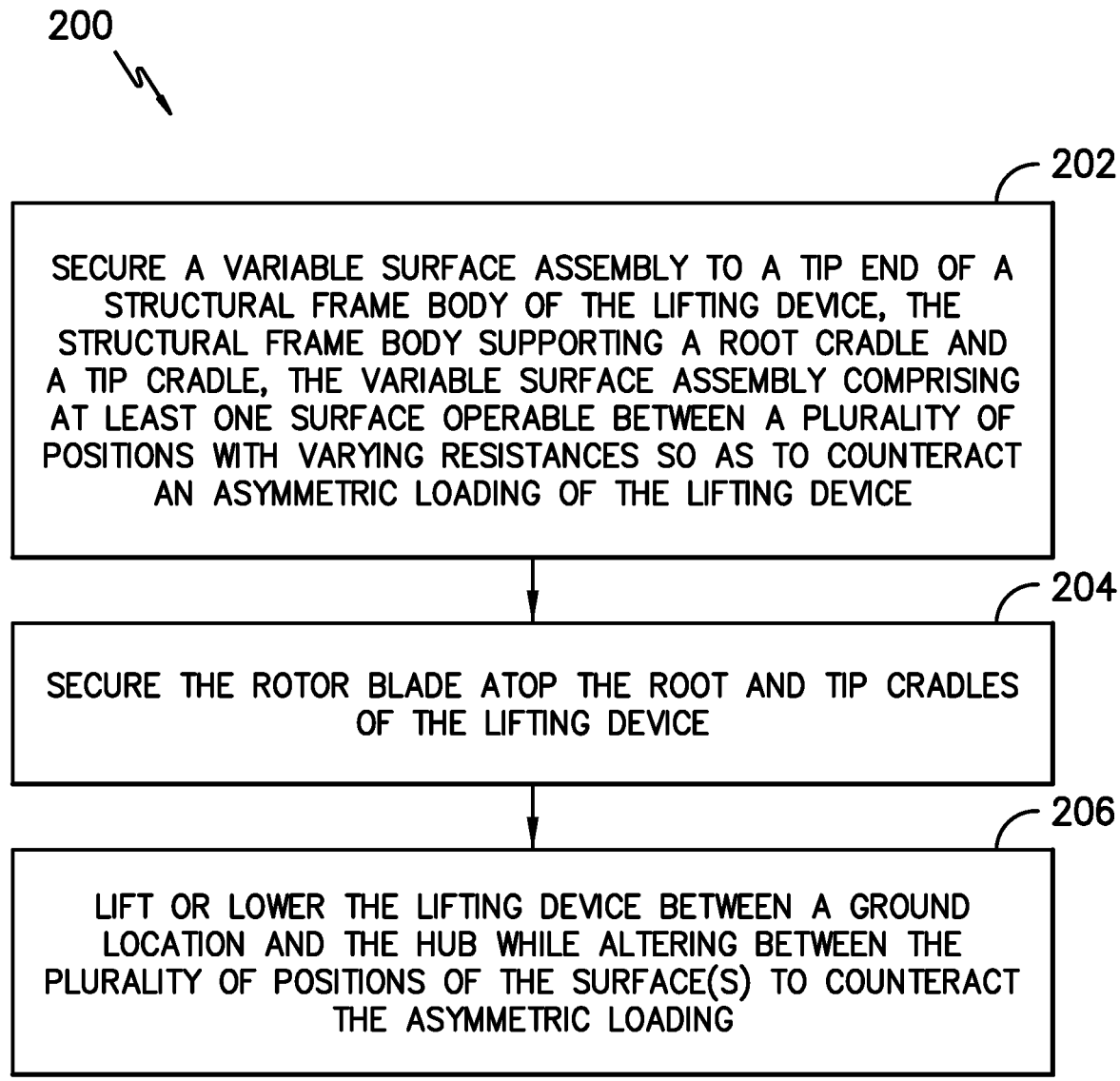
FIG. -19-

LIFTING DEVICE FOR A WIND TURBINE ROTOR BLADE

FIELD

The present disclosure relates in general to wind turbines, and more particularly to lifting devices for wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The typical construction of a wind turbine involves erecting the tower and then connecting various other components to the erected tower. For example, the rotor blades may be lifted to an appropriate height and connected to the tower after erection of the tower. In some cases, each of the rotor blades is connected to a hub before lifting, and the connected rotor blades and hub are then lifted and connected to the tower as a unit. Trends towards taller towers and larger rotor diameters, however, can limit and/or preclude lifting such units to the tower due to size and/or cost. More specifically, as the rotor diameter and/or mass and hub height increases, there are few (if any) cranes that can lift such structures. Further, the sail area can become so large, that the available wind window to conduct such lifts approaches zero, i.e. the cranes cannot lift the rotor without tipping over.

Thus, current systems and methods for lifting the rotor blades involve lifting each rotor blade uptower individually using, for example, a cradle, sling, or clamping-type blade lifting tool that is lifted using a crane. Individual rotor blades can then be connected to the hub.

When installing the blades individually using such a lifting tool, the center of gravity of the blade has to be located under the crane hook for it to remain stable and hang balanced. However, due to the asymmetrical nature of wind turbine rotor blades, the center of gravity thereof is not at its center. More particularly, when the blade is positioned in the lifting device properly, there will be a short but very large diameter root section on one side of the tool and a very long but aerodynamically shaped section on the other side, thereby causing the asymmetric load. When exposed to an even wind flow, the root section will create a higher resistance than the long blade section on the tip side, despite the fact that it is much shorter. In simple terms, the root section has a higher drag coefficient and therefore creates a greater drag force than the tip of the blade. This imbalance causes rotation of the entire system.

Therefore, conventional systems utilize one or more tag lines connected to the lifting tool that can be held by an operator on the ground as a rotor blade is lifted uptower. As the rotor blade is lifted, however, control of the load via the tag line(s) becomes less effective. More specifically, the operator has to apply more and more force to the tag line(s) as the load is lifted with less results. In addition, due to the shape of the rotor blade (i.e. a thick, round root end that tapers to a long, slender tip end), the blade can experience asymmetric loading (e.g. due to the incoming wind) as it is lifted uptower.

In view of the aforementioned, an improved lifting device for lifting wind turbine rotor blades uptower is desired in the art.

BRIEF DESCRIPTION

Aspects and advantages of the disclosure will be set forth in part in the following description, or may be obvious from the description, or may be learned through practice of the disclosure.

In one aspect, the present disclosure is directed to a lift system for a rotor blade of a wind turbine. The lift system includes a lifting device having a structural frame body having a root end and a tip end. The root end supports a root cradle and the tip end supports a tip cradle. The root and tip cradles each have a profile that corresponds to at least one exterior surface of the rotor blade so as to receive and support at least a portion of the rotor blade. Thus, due to a shape of the rotor blade, when the rotor blade is installed in the lifting device and lifted uptower, the rotor blade can experience an asymmetric loading. Accordingly, the lift system also includes a variable airflow assembly coupled to tip end of the lifting device. The variable airflow assembly includes at least one surface moveable between a plurality of positions having varying resistances so as to counteract the asymmetric loading.

In an embodiment, the plurality of positions may include, at least, a first position and a second position. In an embodiment, the surface(s) may be one of a plurality of surfaces mounted to a frame member. In such embodiments, the first position may be synonymous with the plurality of surfaces being in an open position with respect to the frame member and the second position may be synonymous with the plurality of surfaces being in a closed position with respect to the frame member, wherein the open position provides a first resistance with respect to the asymmetric loading and the closed position provides a second resistance with respect to the asymmetric loading. Further, in such embodiments, the second resistance is greater than the first resistance.

In another embodiment, the surface(s) may be secured to a hinge point. In such embodiments, the first position may be synonymous with the surface(s) being in a compressed position and the second position may be synonymous with the surface(s) being in an expanded position from the hinge point, wherein the compressed position provides a first resistance with respect to the asymmetric loading and the expanded position provides a second resistance with respect to the asymmetric loading. Further, in such embodiments, the second resistance is greater than the first resistance.

In further embodiments, the variable airflow assembly may be moveably coupled to tip end of the lifting device such that the variable airflow assembly can be moved to a hidden position with respect to the structural frame body to minimize an impact of the variable airflow assembly after the rotor blade has been installed uptower.

In additional embodiments, the lift system may also include a gyroscope assembly having at least one gyroscope configured to modify an orientation of the lifting device as the lifting device is lifted or lowered to and from a hub mounted to a tower of the wind turbine. In one embodiment, the gyroscope assembly may include a plurality of gyroscopes, such as a first gyroscope and a second gyroscope. In such embodiments, the first and second gyroscopes may be coupled to at least one of the root and the tip ends of the structural frame body, respectively, or at an intermediate location along the structural frame body, such as the center of the structural frame body.

In another embodiment, the lift system may also include a drive mechanism for driving the variable airflow assembly and/or the gyroscope assembly. For example, in an embodiment, the drive mechanism may include a generator, an integrated motor, or a separate motor.

In still another embodiment, the lift system may include a controller configured to control the drive mechanism of the at least one of the variable airflow assembly or the gyroscope assembly. For example, in one embodiment, the controller may include a remote control, a turbine controller of the wind turbine, or a separate controller from the wind turbine. Moreover, in an embodiment, the lift system may include one or more sensors communicatively coupled to the controller for monitoring the orientation of the lifting device as the lifting device is lifted or lowered to and from the hub mounted to the tower. In such embodiments, as an example, the sensor(s) may include Global Positioning Sensor (GPS) sensors, accelerometers, smart sensors, or the like as well as combinations thereof.

In another aspect, the present disclosure is directed to a method for controlling orientation of a lifting device for a rotor blade of a wind turbine as the lifting device is lifted or lowered to and from a hub mounted to a tower of the wind turbine. The method includes securing a variable airflow assembly to a tip end of a structural frame body of the lifting device. The structural frame body supports a root cradle and a tip cradle. The variable airflow assembly includes at least one surface moveable between a plurality of positions having varying resistances so as to counteract an asymmetric loading of the lifting device. The method also includes securing the rotor blade atop the root and tip cradles of the lifting device. Further, the method includes lifting or lowering the lifting device between a ground location and the hub while altering between the plurality of positions of the surface(s) to counteract the asymmetric loading.

It should be understood that the methods described herein may further include any of the additional steps and/or features as described herein. In addition, in an embodiment, securing the variable airflow assembly to the tip end of the structural frame body of the lifting device may include moveably securing the variable airflow assembly to the tip end of the structural frame body.

For example, in one embodiment, the method may include moving the variable airflow assembly to a hidden position with respect to the structural frame body to minimize an impact of the variable airflow assembly after the rotor blade has been removed from the lifting device. In certain embodiments, as an example, moving the variable airflow assembly to the hidden position may include folding the variable airflow assembly against the structure frame body, sliding the variable airflow assembly towards a center location of the structural frame body, compressing the variable airflow assembly, or receiving the variable airflow assembly within a recess of the structural frame body.

Moreover, in an embodiment, the method may include coupling a gyroscope assembly having at least one gyroscope to the lifting device and fine tuning the orientation of the lifting device as the lifting device is installed onto the hub mounted to the tower of the wind turbine.

In yet another embodiment, the method may include automatically controlling, via a processor of a controller, at least one of the variable airflow assembly or the gyroscope assembly so as to modify the orientation of the lifting device as the lifting device is lifted or lowered to and from the hub mounted to the tower.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a side view of one embodiment of a rotor blade according to the present disclosure;

FIG. 3 illustrates a perspective view of one embodiment of a lift system according to the present disclosure;

FIG. 4 illustrates a perspective view of one embodiment of a lifting device according to the present disclosure;

FIG. 5 illustrates a perspective view of one embodiment of a gyroscope according to the present disclosure;

FIG. 6 illustrates a perspective view of one embodiment of a lift system for a rotor blade of a wind turbine, particularly illustrating first and second gyroscopes mounted at opposing ends of a lifting device of the lift system;

FIG. 7 illustrates a schematic diagram of one embodiment of a lift system for a rotor blade of a wind turbine, particularly illustrating first and second gyroscopes mounted at opposing ends of a lifting device of the lift system and having reversed tilt angles;

FIG. 8 illustrates a perspective view of one embodiment of a variable airflow assembly according to the present disclosure, particularly illustrating a plurality of surfaces of the variable airflow assembly in an open position;

FIG. 9 illustrates a perspective view of the variable airflow assembly of FIG. 8, particularly illustrating the plurality of surfaces of the variable airflow assembly in a closed position;

FIG. 10 illustrates a perspective view of another embodiment of a variable airflow assembly according to the present disclosure, particularly illustrating a surface of the variable airflow assembly in a compressed position;

FIG. 11 illustrates a perspective view of the variable airflow assembly of FIG. 10, particularly illustrating the surface of the variable airflow assembly in an expanded position;

FIGS. 12A and 12B illustrate schematic views of one embodiment of the variable airflow assembly according to the present disclosure, particularly illustrating the variable airflow assembly in an active position and a hidden position, respectively;

FIGS. 13A and 13B illustrate schematic views of another embodiment of the variable airflow assembly according to the present disclosure, particularly illustrating the variable airflow assembly in an active position and a hidden position, respectively;

FIG. 14 illustrates a simplified, block diagram of one embodiment of suitable components that may be included in a controller according to the present disclosure;

FIG. 15 illustrates a schematic diagram of one embodiment of a failsafe mode of operation implemented by a controller of the lift system according to the present disclosure;

FIG. 16 illustrates a schematic diagram of another embodiment of a failsafe mode of operation implemented by a controller of the lift system according to the present disclosure;

FIG. 17 illustrates a schematic diagram of yet another embodiment of a failsafe mode of operation implemented by a controller of the lift system according to the present disclosure;

FIG. 18 illustrates a schematic diagram of still another embodiment of a failsafe mode of operation implemented by a controller of the lift system according to the present disclosure; and, FIG. 19 illustrates a flow diagram of one embodiment of a method for controlling orientation of a lifting device for a rotor blade of a wind turbine as the lifting device is lifted or lowered to and from a hub mounted to a tower of the wind turbine according to the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

When lifting an asymmetrical load under a crane hook in an open environment where wind is present, such load can develop a torque and begin to rotate due to the wind-vane effect. An example of such asymmetrical loading includes a wind turbine rotor blade being lifted uptower. This effect is typically compensated by the use of at least one tag line. As the rotor blade is lifted, however, control of the load via the tag line(s) becomes less effective. More specifically, the operator has to apply more and more force to the tag line(s) as the load is lifted with less results. In addition, due to the shape of the rotor blade (i.e. a thick, round root end that tapers to a long, slender tip end), the blade can experience asymmetric loading (e.g. due to the incoming wind) as it is lifted uptower.

Generally, the present disclosure is directed to a lift system for a wind turbine rotor blade and a method of controlling the ascent and descent thereof with or without a rotor blade loaded into it, without the aid of tag lines or tag line crews. More specifically, the present disclosure is directed to a system and method for eliminating this undesirable torque by creating a compensating torque in the opposite direction by utilizing a surface or vane that is variable in size and/or aerodynamic resistance. Thus, by using surfaces which are variable in size and/or aerodynamic resistance, a torque of equal but opposite magnitude can be created to cancel out the undesirable rotation of the lifting device, thus stabilizing the load on its way uptower.

In addition, in one embodiment, the lift system of the present disclosure is further equipped with a positioning control device having of at least one gyroscope suspended in a gimbal mount which allows for the creation of the forces created by the gyroscopic precession to allow for a precise positioning of said load. More particularly, utilizing the precessive forces allows the load to be precisely positioned in order to facilitate the assembly of the hoisted object to a supporting structure. As generally understood, a gyroscope tends to maintain its position in space or in other words, the axis, around which it is revolving, and tends to resist changes in its orientation by outside influences. Inversely, if an outside force causes a change in the position of the axis, a reacting force in a plane perpendicular to that of the outside force is being generated. Accordingly, the present disclosure utilizes this gyroscopic behavior, which is also called precession. For example, a pair of gyroscopes are configured to spin in a vertical plane. More specifically, the gyroscopic wheels are suspended in a way that they can be tilted around a horizontal axis. If the gyroscopes are tilted in opposite directions, the resulting precession forces create a torque which will cause the lifting device to rotate. Further, a single force is exerted when the gyroscope tilts that is related to the degree to which it is tilted and the speed at which it tilts. Once this force has been exerted, the system coasts to a stop, until the gyroscope is tilted again when it exerts another force. Thus, by tilting the gyroscopes, a more direct control over the load is achieved compared to tag line input from a ground-based crew.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, such as via the roots (discussed below) of the rotor blades, which is in turn connected to a main flange that turns a main rotor shaft (not shown). The wind turbine power generation and control components are typically housed within the nacelle 14 and/or the tower 12. The view of FIG. 1 is provided for illustrative purposes only to place the present disclosure in an exemplary field of use. It should be appreciated that the disclosure is not limited to any particular type of wind turbine configuration.

Referring now to FIG. 2, a perspective view of one of the rotor blades 16 of FIG. 1 according to the present disclosure is illustrated. As shown, the rotor blade 16 includes exterior surfaces defining a pressure side 22 and a suction side 24 extending between a leading edge 26 and a trailing edge 28, and extends from a blade tip 32 to a blade root 34. The exterior surfaces may be generally aerodynamic surfaces having generally aerodynamic contours, as is generally known in the art. In some embodiments, the rotor blade 16 may include a plurality of individual blade segments aligned in an end-to-end order from the blade tip 32 to the blade root 34. Each of the individual blade segments may be uniquely configured such that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flap-wise direction and/or in a generally edge-wise direction. The flap-wise direction may generally be construed as the direction (or the opposite direction) in which the aerodynamic lift acts on the rotor blade 16. The edge-wise direction is generally perpendicular to the flap-wise direction. Flap-wise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Still referring to FIG. 2, the rotor blade 16 may further define chord 42 and a span 44. Further, as shown in FIG. 2, the chord 42 may vary throughout the span 44 of the rotor blade 16. Thus, a local chord may be defined for the rotor blade 16 at any point on the rotor blade 16 along the span 44. The exterior surfaces, as discussed above, may extend in the generally span-wise direction between the tip 32 and root 34.

Referring now to FIGS. 3 through 7, various components of a lift system 50 for a rotor blade 16 of a wind turbine 10 according to the present disclosure are illustrated. As shown in FIGS. 3 and 4, the lift system 50 includes a lifting device 52 configured to support at least a portion of the rotor blade 16. More specifically, as shown, the lifting device 52 includes at least one cradle 54, 56, which is described in more detail below. For example, as shown, the lifting device 52 includes a root cradle 54 and a tip cradle 56 for supporting portions of the blade 16 near the blade root 34 and the blade tip 32, respectively. Further, in certain embodiments, each of the cradles 54, 56 generally has a profile that corresponds to at least one of the exterior surfaces of the rotor blade 16 so as to support at least a portion of the rotor blade 16. For example, as shown in FIGS. 3 and 4, the root cradle 54 has a profile that generally corresponds to the blade root 34 of the rotor blade 16, whereas the tip cradle 56 has a profile that generally corresponds to the blade tip 32 of the rotor blade 16.

In addition, as shown in FIGS. 3 and 4, the lifting device 52 may include a structural frame body 55 for connecting and supporting the root cradle 54 and the tip cradle 56. More specifically, as shown, the structural frame body 55 may include one or more cradle supports 57 configured to support each of the root and tip cradles 54, 56, respectively. Thus, as shown, the root and tip cradles 54, 56 may be mounted to respective ends of the structural frame body 55, i.e. the root end 65 and the tip end 67 of the structural frame body 55, respectively. Further, the cradle supports 57 may be joined or coupled together via a main support 59 or beam. Thus, in additional embodiments, the lift system 50 may also include a crane (not shown) and a crane cable or sling 58 (FIGS. 3 and 4). In such embodiments, the crane may be coupled to the cable or sling 58, which is secured to the structural frame body 55 such that the crane can lift and/or lower the rotor blade 16 between the hub 18 and the tower 12. More specifically, the crane cable or sling 58 may include a synthetic fabric sling and/or a central attachment point so as to provide stability to the lifting device 52 during lifting and/or lowering.

The crane as described herein may be any suitable machine for generally lifting equipment and/or materials, such as a mobile crane, a floating crane, an aerial crane, or a fixed crane (such as a tower crane), as is generally known in the art. Further, the crane cable or sling 58 may be connected to the crane, and the crane may control movement of the crane cable or sling 58, as is generally known in the art.

As shown particularly in FIG. 3, due to a shape of the rotor blade 16, when the rotor blade 16 is installed in the lifting device 52 and lifted uptower, the rotor blade 16 can experience asymmetric loading. Thus, as shown in FIGS. 3-13B, the lift system 50 may also include a variable airflow assembly 100 coupled to tip end 67 of the lifting device 52. The variable airflow assembly 100 includes at least one surface 102 operable between a plurality of positions with varying resistances (i.e. varying aerodynamic drag coefficients) so as to counteract the asymmetric loading. For example, as shown in FIGS. 8-9 and 10-11, in an embodiment, the plurality of positions may include, at least, a first position (FIGS. 8, 10) and a second position (FIGS. 9, 11).

In addition, the surface(s) 102 of the variable airflow assembly 100 described herein may have a variety of suitable configurations. For example, in an embodiment, as shown in FIG. 8, the variable airflow assembly 100 may include a plurality of surfaces 102 mounted to a frame member 104. More particularly, as shown in FIGS. 8 and 9, the surfaces 102 may be vanes or louvers. Further, in such embodiments, as shown in FIG. 8, the first position may be synonymous with the plurality of surfaces 102 being in an open position with respect to the frame member 104. Further, as shown in FIG. 9, the second position may be synonymous with the plurality of surfaces 102 being in a closed position with respect to the frame member 104. Thus, the open position provides a first resistance with respect to the asymmetric loading, whereas the closed position provides a second resistance with respect to the asymmetric loading. In such embodiments, the second resistance is greater than the first resistance.

In particular embodiments, the surface(s) 102 of the variable airflow assembly 100 may similar to an HVAC louver system. As such, in certain embodiments, the position of the louvers may be controlled by various devices such as damper actuators, motors, plungers, etc. More specifically, in certain embodiments, as shown in FIG. 9, the louvers 104 can be controlled by a programmable controller (PLC) 105 with an analog output, such as a 4-20 mA output, or by a safety rated field bus, like CAN or ProfiNet. Thus, in such embodiments, the surface(s) 102 of the variable airflow assembly 100 can utilize a safety PLC with an output, either a safety rated field bus or traditional analog output, to hold the last known position of the louvers in the event power is lost or the e-stop is engaged.

Referring now to FIGS. 10 and 11, in another embodiment, the surface(s) 102 of the variable airflow assembly 100 may be expandable from a hinge point 106. In such embodiments, as shown in FIG. 10, the first position may be synonymous with the surface 102 being in a compressed position. Further, as shown in FIG. 11, the second position may be synonymous with the surface 102 being in an expanded position. Thus, the compressed position provides a first resistance with respect to the asymmetric loading and the expanded position provides a second resistance with respect to the asymmetric loading. Further, in such embodiments, the second resistance is greater than the first resistance.

In further embodiments, the variable airflow assembly 100 may be moveably coupled to tip end 67 of the lifting device 52 such that the variable airflow assembly 100 can be moved to a hidden position with respect to the structural frame body 55 to minimize an impact of the variable airflow assembly 100 after the rotor blade 16 has been removed from the lifting device 52 (e.g. after the rotor blade 16 has been installed uptower). In certain embodiments, as shown in FIGS. 12A and 12B, the variable airflow assembly 100 may be moved to the hidden position by folding the assembly 100 against the structure frame body 55, e.g. by rotating the variable airflow assembly 100 about hinge point 108 such that the variable airflow assembly 100 sits flush against the structural frame body 55. Alternatively, as shown in FIG. 6, the variable airflow assembly 100 may be moved to the hidden position by sliding the variable airflow assembly 100, e.g. via a rail system 110, towards a center location of the structural frame body 55. In still another embodiment, as shown in FIGS. 10 and 11, the variable airflow assembly 100 may be moved to the hidden position by compressing the variable airflow assembly 100 from an expanded position to a compressed position. In such embodiments, the compressed surface assembly 100 may also then be folded against the structural frame body 55. In yet another embodiment, as shown in FIGS. 13A and 13B, the variable airflow assembly 100 may be moved to the hidden position by receiving the variable airflow assembly 100 within a recess 112 of the structural frame body 55, i.e. when the surface assembly 100 is no longer in use or needed.

Referring still to FIGS. 3-7, the lift system 50 may also include a gyroscope assembly 60 having at least one gyroscope 62 coupled to the lifting device 52. As used herein, a gyroscope generally refers to a device used for measuring or maintaining orientation and angular velocity. More specifically, as shown in FIG. 5, a perspective view of one embodiment of the gyroscope 62 is illustrated. As shown, the illustrated gyroscope 62 includes a spinning wheel 66 or disc that is mounted in a manner, such as a fork mount, to allow for the rotation of the wheel 66 about an axis of rotation 74 and about the axis of the fork. Thus, rotation of the gyroscope 62 can be used to modify an orientation of the lifting device 52 as the device 52 is lifted or lowered to and from the hub 20 mounted uptower.

In further embodiments, the gyroscope assembly 60 may include a plurality of gyroscopes 62, 64. For example, as shown particularly in FIGS. 3-4 and 6-8, the gyroscope assembly 60 may include a first gyroscope 62 and a second gyroscope 64. More specifically, as shown in the illustrated embodiments, the first and second gyroscopes 62, 64 may be coupled to opposing ends, i.e. the root and tip ends 65, 67, of the structural frame body 55. It should be understood that the first and second gyroscopes 62, 64 may be mounted to have any suitable mounting orientation. For example, as shown, the first and second gyroscopes 62, 64 may be mounted to extend generally parallel with the top beam of the structural frame body 55. Alternatively, as shown in FIG. 4, the first and second gyroscopes 62, 64 may be mounted to extend generally perpendicular with the top beam of the structural frame body 55. In yet another embodiment, the first and second gyroscopes 62, 64 may be mounted at any other orientation with respect to the structural frame body 55. Furthermore, the first and second gyroscopes 62, 64 may located at any suitable location along the structural frame body 55. For example, as shown in FIG. 3, the first and second gyroscopes 62, 64 may be spaced evenly from the center location of the structural frame body 55 (e.g. as shown by distance r). Alternatively, as shown in FIG. 4, the first and second gyroscopes 62, 64 may be mounted at or towards the center location of the structural frame body 55.

In additional embodiments, as shown in FIGS. 3 and 4, the lift system 50 may include one or more drive mechanisms 80 for driving the variable airflow assembly 100 and/or the gyroscope assembly 60. For example, in certain embodiments, the drive mechanism 80 may be a generator, an integrated motor, a separate motor, or any other suitable power device. In one embodiment, for example, the first and second gyroscopes 62, 64 may each be controlled via a speed motor 63, 65 and/or a tilt motor 67, 69. In such embodiments, where the first and second gyroscopes 62, 64 are controlled by respective speed motors 63, 65 that can be controlled by a speed-controlled drive, the speed-controlled drive can be safety-rated by having safe speed shutdown definitions built therein to pre-determined Safety Integrity Level (SIL) ratings. In such embodiments, the safe speed generally refers to the maximum speed of the gyroscope motors 63, 65. With the safety drive, the safe speed may be equal to a certain percentage of the maximum speed rating. If further embodiments, the motors 63, 65 do not have to be controlled by the drive, but rather, the safe shutdown mechanism can be achieved through a relay logic arrangement, comparable to the drive SIL rating.

In further embodiments, the tilt motors 67, 69 may be controlled by a position-controlled drive or servomotor. This enables the drives to be safety rated and have safe position shutdown definitions programmed therein. The safe position, for example, can be the last position of the tilt motors 67, 69. Thus, when power is lost or an emergency stop is engaged, the brakes of the motors 67, 69 can be applied and the drive(s) holds the last position. Again, the tilt motors 67, 69 do not necessarily have to be controlled by the drive and the safe shutdown mechanism can still be achieved through a relay logic arrangement, comparable to the drive SIL rating.

Accordingly, as shown in FIG. 8-9 or 10-11, the drive mechanism 80 described herein may be configured to move the surfaces 102 of the variable airflow assembly 100 between the plurality of positioned described herein. Furthermore, as shown in FIGS. 6 and 7, the drive mechanism 80 may be configured to orient the tilt angles/directions 76, 78 of the first and second gyroscopes 62, 64 in opposing directions. Thus, as shown, the lifting device 52 can be rotated about the single suspension point (i.e. the crane hook), whereas reversing the tilt angle of the first and second gyroscopes 62, 64 is configured to generate a torque T (FIGS. 6 and 7) to stop and/or reverse the direction of rotation of the lifting device 52.

In addition, as shown, the lift system 50 may further include a controller 82 communicatively coupled with one or more sensors 90, 92, e.g. for monitoring and controlling the drive mechanism 80 of the variable airflow assembly 100 and/or the gyroscope assembly 60 as well as the various motors described herein. Moreover, in certain embodiments, the sensors 90, 92 may be used to measure one or more wind conditions, such as wind speed and/or wind direction. In such embodiments, the lift system 50 may include, as an example, a GPS system on one or more ends of the structural frame body 55 to detect motion and/or counteract said motion as well as wind condition sensors. Thus, the controller 82 may be configured to utilize various inputs to determine how to actuate the variable airflow assembly 100 and/or the gyroscope assembly 60. By detecting the wind speed and/or wind direction, the GPS system can quickly detect changes of the system 50 as the system 50 is being raised and/or lowered.

The controller 82 as described herein may be incorporated into a suitable control system of the wind turbine 10 (not shown), a handheld remote, a personal digital assistant, cellular telephone, a separate controller or computer having one or more processor(s) and associated memory devices. Further, in particular embodiments, as an example, the sensor(s) 90, 92 may include Global Positioning Sensor (GPS) sensors, accelerometers, smart sensors, or the like as well as combinations thereof. Accordingly, in particular embodiments, the controller 82 may allow for a Z-coordinate of the structural frame body 55 to change in a vertical direction up to predetermined altitude or height while maintaining an X-coordinate and a Y-coordinate of the structural frame body 55 via the first and second gyroscopes 62, 64 as the lifting device 52 is brought closer to the hub 18.

In another embodiment, the controller 82 may control the lift system 50 by receiving a plurality of sensor signals from one or more sensors 90, 92, respectively, and controlling the drive mechanism 80 so as to alter a position of the surface(s) 102 and/or gyroscopes 62, 64 based on the sensor signals. More specifically, in one embodiment, the controller 82 may open or close the surface(s) 102 and/or reverse the tilt angles of the first and second gyroscopes 62, 64 to stop and/or reverse a direction of rotation of the lifting device 52.

Further, as shown in FIG. 14, there is illustrated a block diagram of one embodiment of various components of the controller 82 according to the present disclosure. As shown, the controller 82 may include one or more processor(s) 83 and associated memory device(s) 85 configured to perform a variety of computer-implemented functions (e.g., performing the methods, steps, calculations and the like and storing relevant data as disclosed herein). Additionally, the controller 82 may also include a communications module 87 to facilitate communications between the controller 82 and the various components of the variable airflow assembly 100 and/or the gyroscope assembly 60. Further, the communications module 87 may include a sensor interface 89 (e.g., one or more analog-to-digital converters) to permit signals transmitted from the sensors 90, 92 to be converted into signals that can be understood and processed by the processors 83. It should be appreciated that the sensors 90, 92 may be communicatively coupled to the communications module 87 using any suitable means. For example, as shown in FIG. 14, the sensors 90, 92 are coupled to the sensor interface 89 via a wired connection. However, in other embodiments, the sensors 90, 92 may be coupled to the sensor interface 89 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 85 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 85 may generally be configured to store suitable computer-readable instructions that, when implemented by the processor(s) 58, configure the controller 82 to perform various functions.

In further embodiments, upon engagement of an emergency stop or power loss, the controller 82 is also configured to operate in a failsafe mode. For example, in such embodiments, the failsafe mode may include maintaining the gyroscope motors at a maximum speed, maintaining the gyroscope tilt motors at the last known position and/or maintaining the louvers at the last known position. In particular, as shown in FIG. 15, a schematic diagram of one embodiment of a failsafe mode or safe shutdown procedure implemented by the controller 82 is illustrated. As shown, FIG. 15 generally illustrates the initiation of the failsafe mode, in which the controller 82 is communicatively coupled to a motor 122 or converter 124 of the system. Further, as shown, the system may also include one or more batteries 126. Thus, as shown the controller 82 is configured to control an automatic transfer switch 120 to initiate an emergency stop 114. The emergency stop 114 can thus engage a safety relay 116 (e.g. during the power loss) and a reset 118 (e.g. when power is restored).

Referring now to FIG. 16, the failsafe mode of the controller 82 may also include holding the louvers 102 to their last known positions. For example, as shown, upon engagement of an emergency stop or power loss, the controller 82 may be configured to receive signals 128 associated with the last known position of each of the louvers 102. Thus, the controller 82 can actuate and/or hold, e.g. via a plurality of actuators, the last known position of each of the louvers until the power loss is restored.

Referring now to FIG. 17, the failsafe mode of the controller 82 may also include maintaining a speed of the gyroscopic motors 63, 65 to a pre-determined speed. Similarly, as shown in FIG. 18, the failsafe mode of the controller 82 may also maintaining an angle of the first and second gyroscopes via the tilt motors 67, 69, e.g. at the last known position.

Referring now to FIG. 19, a flow diagram of one embodiment of a method 100 for controlling orientation of a lifting device for a rotor blade of a wind turbine as the lifting device is lifted or lowered to and from a hub mounted to a tower of the wind turbine is illustrated. In general, the method 200 will be described herein with reference to the wind turbine 10 and lift system 50 shown in FIGS. 1-18. However, it should be appreciated that the disclosed method 200 may be implemented with wind turbines having any other suitable configurations. In addition, although FIG. 19 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include securing the variable airflow assembly 100 to the tip end 67 of the structural frame body 55 of the lifting device 52. As mentioned, the structural frame body 55 supports the root cradle 54 and the tip cradle 56. Further, as mentioned, the variable airflow assembly 100 includes at least one surface 102 operable between a plurality of positions with varying resistances so as to counteract an asymmetric loading of the lifting device 52. In an embodiment, for example, the variable airflow assembly 100 may be moveably secured to the tip end 67 of the structural frame body 55 of the lifting device 52. As shown at (204), the method 200 also includes securing the rotor blade 16 atop the root and tip cradles 54, 56 of the lifting device 52. In alternative embodiments, it should be understood that the lifting device 52 may also be lifted or lowered to and from the hub without the rotor blade 16 installed therein. As shown at (206), the method 200 may include lifting or lowering the lifting device 52 between a ground location and the hub 18 while altering between the plurality of positions of the surface(s) 102 to counteract the asymmetric loading.

In certain embodiments, once the rotor blade 16 is removed from the lifting device 52, the method 200 may also include moving the variable airflow assembly 100 to a hidden position with respect to the structural frame body 55, i.e. to minimize an aerodynamic impact of the variable airflow assembly 100. In certain embodiments, as an example, the method 200 may include folding the variable airflow assembly 100 against the structure frame body 55. Moreover, in an embodiment, the method 200 may include sliding the variable airflow assembly 100 towards a center location of the structural frame body 55. In yet another embodiment, the method 200 may include compressing the variable airflow assembly 100. In additional embodiments, the method 200 may include receiving the variable airflow assembly 100 within a recess of the structural frame body 55.

Further aspects of the invention are provided by the subject matter of the following clauses:

Clause 1. A lift system for a rotor blade of a wind turbine, the lift system comprising:

a lifting device comprising a structural frame body having a root end and a tip end, the root end supporting a root cradle, the tip end supporting a tip cradle, the root and tip cradles each comprising a profile that corresponds to at least one exterior surface of the rotor blade so as to receive and support at least a portion of the rotor blade, wherein, when the rotor blade is installed in the lifting device and lifted uptower, the rotor blade experiences an asymmetric loading; and, a variable airflow assembly coupled to tip end of the lifting device, the variable airflow assembly comprising at least one surface moveable between a plurality of positions having varying resistances so as to counteract the asymmetric loading.

Clause 2. The lift system of clause 1, wherein the plurality of positions comprise, at least, a first position and a second position.

Clause 3. The lift system of clause 2, wherein the at least one surface is one of a plurality of surfaces mounted to a frame member, the first position being synonymous with the plurality of surfaces being in an open position with respect to the frame member and the second position being synonymous with the plurality of surfaces being in a closed position with respect to the frame member, wherein the open position provides a first resistance with respect to the asymmetric loading and the closed position provides a second resistance with respect to the asymmetric loading, the second resistance being greater than the first resistance.

Clause 4. The lift system of clause 2, wherein the at least one surface is secured to a hinge point, the first position being synonymous with the at least one surface being in a compressed position and the second position being synonymous with the at least one surface being in an expanded position from the hinge point, wherein the compressed position provides a first resistance with respect to the asymmetric loading and the expanded position provides a second resistance with respect to the asymmetric loading, the second resistance being greater than the first resistance.

Clause 5. The lift system of any of the preceding clauses, wherein the variable airflow assembly is moveably coupled to tip end of the lifting device such that the variable airflow assembly can be moved to a hidden position with respect to the structural frame body to minimize an impact of the variable airflow assembly after the rotor blade has been installed uptower.

Clause 6. The lift system of any of the preceding clauses, further comprising a gyroscope assembly comprising at least one gyroscope configured to modify an orientation of the lifting device as the lifting device is lifted or lowered to and from a hub mounted to a tower of the wind turbine.

Clause 7. The lift system of clause 6, wherein the at least one gyroscope comprises a first gyroscope and a second gyroscope, the first and second gyroscopes being coupled at least one of the root and the tip ends of the structural frame body, respectively, or at an intermediate location along the structural frame body.

Clause 8. The lift system of clause 6, further comprising a drive mechanism for driving at least one of the variable airflow assembly or the gyroscope assembly, the drive mechanism comprising at least one of a generator, an integrated motor, or a separate motor.

Clause 9. The lift system of clause 8, further comprising a controller configured to control the drive mechanism of the at least one of the variable airflow assembly or the gyroscope assembly.

Clause 10. The lift system of clause 8, wherein, when power is lost or an emergency stop is initiated, the controller is configured to operate in a failsafe mode in which at least one of a speed of the at least one gyroscope, a tilt of the at least one gyroscope, or a position of the surface are controlled to a predetermined safety threshold.

Clause 11. The lift system of clause 9, wherein the controller comprises at least one of a remote control, a turbine controller of the wind turbine, or a separate controller from the wind turbine.

Clause 12. The lift system of clause 9, further comprising one or more sensors communicatively coupled to the controller for monitoring the orientation of the lifting device as the lifting device is lifted or lowered to and from the hub mounted to the tower, wherein the one or more sensors comprise at least one of Global Positioning Sensor (GPS) sensors, accelerometers, smart sensors, or combinations thereof.

Clause 13. A method for controlling orientation of a lifting device for a rotor blade of a wind turbine as the lifting device is lifted or lowered to and from a hub mounted to a tower of the wind turbine, the method comprising:

securing a variable airflow assembly to a tip end of a structural frame body of the lifting device, the structural frame body supporting a root cradle and a tip cradle, the variable airflow assembly comprising at least one surface operable between a plurality of positions with varying resistances so as to counteract an asymmetric loading of the lifting device;

securing the rotor blade atop the root and tip cradles of the lifting device; and, lifting or lowering the lifting device between a ground location and the hub while altering between the plurality of positions of the at least one surface to counteract the asymmetric loading.

Clause 14. The method of clause 13, wherein the at least one surface is one of a plurality of surfaces mounted to a frame member, the first position being synonymous with the plurality of surfaces being in an open position with respect to the frame member and the second position being synonymous with the plurality of surfaces being in a closed position with respect to the frame member, wherein the open position provides a first resistance with respect to the asymmetric loading and the closed position provides a second resistance with respect to the asymmetric loading, the second resistance being greater than the first resistance.

Clause 15. The method of clauses 13-14, wherein the at least one surface is secured to a hinge point, the first position being synonymous with the at least one surface being in a compressed position and the second position being synonymous with the at least one surface being in an expanded position from the hinge point, wherein the compressed position provides a first resistance with respect to the asymmetric loading and the expanded position provides a second resistance with respect to the asymmetric loading, the second resistance being greater than the first resistance.

Clause 16. The method of clauses 13-15, further comprising moving the variable airflow assembly to a hidden position with respect to the structural frame body to minimize an impact of the variable airflow assembly after the rotor blade has been removed from the lifting device.

Clause 17. The method of clauses 16, wherein moving the variable airflow assembly to the hidden position comprises at least one of folding the variable airflow assembly against the structure frame body, sliding the variable airflow assembly towards a center location of the structural frame body, compressing the variable airflow assembly, or receiving the variable airflow assembly within a recess of the structural frame body.

Clause 18. The method of clauses 13-17, further comprising:
coupling a gyroscope assembly having at least one gyroscope to the lifting device; and,
fine tuning the orientation of the lifting device as the lifting device is installed onto the hub mounted to the tower of the wind turbine.

Clause 19. The method of clauses 13-18, further comprising automatically controlling, via a processor of a controller, at least one of the variable airflow assembly or the gyroscope assembly so as to modify the orientation of the lifting device as the lifting device is lifted or lowered to and from the hub mounted to the tower.

Clause 20. The method of clauses 13-19, wherein, when power is lost or an emergency stop is initiated, operating, via the controller, at least one of the variable airflow assembly or the gyroscope assembly in a failsafe mode in which at least one of a speed of the at least one gyroscope, a tilt of the at least one gyroscope, or a position of the surface are controlled to a predetermined safety threshold.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lift system for a rotor blade of a wind turbine, the lift system comprising:
a lifting device comprising a structural frame body having a root end and a tip end, the root end supporting a root cradle, the tip end supporting a tip cradle, the root and tip cradles each comprising a profile that corresponds to at least one exterior surface of the rotor blade so as to receive and support at least a portion of the rotor blade, wherein, when the rotor blade is installed in the lifting device and lifted uptower, the rotor blade experiences an asymmetric loading; and,
a variable airflow assembly coupled to the tip end of the lifting device, the variable airflow assembly comprising at least one surface mounted to a frame member, the at least one surface moveable between a plurality of positions having varying resistances so as to counteract the asymmetric loading, the plurality of positions comprising, at least, a first position and a second position, wherein the first position is an open position in which the at least one surface is rotated away from a plane of the frame member to allow airflow through the frame member, and wherein the second position is a closed position in which the at least one surface is generally parallel and in line with the plane of the frame member to limit the airflow through the frame member;
wherein the variable airflow assembly is moveably coupled to the tip end of the lifting device such that the variable airflow assembly can be moved to a hidden position with respect to the structural frame body to minimize an impact of the variable airflow assembly after the rotor blade has been installed uptower.

2. The lift system of claim 1, wherein the at least one surface is one of a plurality of surfaces mounted to the frame member, wherein the open position provides a first resistance with respect to the asymmetric loading and the closed position provides a second resistance with respect to the asymmetric loading, the second resistance being greater than the first resistance.

3. The lift system of claim 1, wherein the at least one surface is secured to a hinge point to allow movement of the at least one surface between the first position and the second position.

4. The lift system of claim 1, further comprising a gyroscope assembly comprising at least one gyroscope configured to modify an orientation of the lifting device as the lifting device is lifted or lowered to and from a hub mounted to a tower of the wind turbine.

5. The lift system of claim 4, wherein the at least one gyroscope comprises a first gyroscope and a second gyroscope, the first and second gyroscopes being coupled to at least one of the root and the tip ends of the structural frame body, respectively, or at an intermediate location along the structural frame body.

6. The lift system of claim 4, further comprising a drive mechanism for driving at least one of the variable airflow assembly or the gyroscope assembly, the drive mechanism comprising at least one of a generator, an integrated motor, or a separate motor.

7. The lift system of claim 6, further comprising a controller configured to control the drive mechanism of the at least one of the variable airflow assembly or the gyroscope assembly.

8. The lift system of claim 7, wherein, when power is lost or an emergency stop is initiated, the controller is configured to operate in a failsafe mode in which at least one of a speed of the at least one gyroscope, a tilt of the at least one gyroscope, or a position of the surface are controlled to a predetermined safety threshold.

9. The lift system of claim 7, wherein the controller comprises at least one of a remote control, a turbine controller of the wind turbine, or a separate controller from the wind turbine.

10. The lift system of claim 7, further comprising one or more sensors communicatively coupled to the controller for monitoring the orientation of the lifting device as the lifting device is lifted or lowered to and from the hub mounted to the tower, wherein the one or more sensors comprise at least one of Global Positioning Sensor (GPS) sensors, accelerometers, smart sensors, or combinations thereof.

* * * * *